United States Patent
Vanbesien et al.

(10) Patent No.: US 6,962,764 B2
(45) Date of Patent: *Nov. 8, 2005

(54) TONER FABRICATION PROCESS

(75) Inventors: Daryl Vanbesien, Burlington (CA); Barkev Keoshkerian, Thornhill (CA); Raj D. Patel, Oakville (CA); Danielle C. Boils-Boissier, Mississauga (CA); Allison Rutland, Milton (CA)

(73) Assignee: Xerox Corporation, Stamford, CT (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/643,368

(22) Filed: Aug. 19, 2003

(65) Prior Publication Data

US 2005/0042535 A1   Feb. 24, 2005

(51) Int. Cl.⁷ ............................................. G03G 9/08
(52) U.S. Cl. ............................. 430/137.14; 430/110.3
(58) Field of Search .................. 430/110.3, 137.14; 523/335

(56) References Cited

U.S. PATENT DOCUMENTS

| | | | |
|---|---|---|---|
| 5,403,693 A | 4/1995 | Patel et al. | 430/137 |
| 5,589,313 A | 12/1996 | Takezawa et al. | 430/122 |
| 5,686,518 A | 11/1997 | Fontenot et al. | 524/458 |
| 5,852,140 A | 12/1998 | Georges et al. | 526/82 |
| 5,922,501 A | 7/1999 | Cheng et al. | 430/137 |
| 5,945,245 A | 8/1999 | Mychajlowskij et al. | 430/137 |
| 5,994,020 A | 11/1999 | Patel et al. | 430/137 |
| 6,132,924 A | 10/2000 | Patel et al. | 430/137 |
| 6,268,102 B1 | 7/2001 | Hopper et al. | 430/137.14 |
| 6,469,094 B1 | 10/2002 | Keoshkerian et al. | 524/502 |
| 6,767,974 B1 * | 7/2004 | Keoshkerian et al. | 526/75 |
| 2004/0202952 A1 * | 10/2004 | Albright et al. | 430/137.14 |

OTHER PUBLICATIONS

Barkev Keoshkerian et al., titled "Process Forming Particles With Functional Groups", U.S. Appl. No. 10/357,540, filed Feb. 3, 2003.

Jose M. Asua, "Miniemulsion polymerization," *Progress in Polymer Science* 27 (2002), pp. 1283-1346.

Ignac Capek et al., "Radical Polymerization in Direct Mini-Emulsion Systems," *Advances in Polymer Science* (2001), vol. 155, pp. 101-165.

* cited by examiner

*Primary Examiner*—John L Goodrow
(74) *Attorney, Agent, or Firm*—Zosan Soong

(57) ABSTRACT

A chemical toner and an emulsion aggregation process for preparing the chemical toner, wherein the chemical toner is composed of: (a) a resin including a compound which exhibits a molecular weight polydispersity of from about 1.1 to about 3.0 (where the resin is produced by a stable free radical polymerization process); (b) an optional wax; and (c) a colorant, wherein the particle size of the chemical toner exhibits a geometric standard deviation of about 1.25 or less.

23 Claims, No Drawings

TONER FABRICATION PROCESS

BACKGROUND OF THE INVENTION

Keoshkerian et al., U.S. Pat. No. 6,469,094 describes a process for the preparation of polymeric particulate materials employing a free radical polymerizable monomer, a free radical initiator and a stable free radical compound wherein the process includes a first bulk polymerization where controlled initiation and limited or partial monomer polymerization is accomplished for the purpose of preparing a prepolymer mixture followed by a second stage miniemulsion polymerization where substantially complete monomer polymerization is accomplished.

In copending application, U.S. Ser. No. 10/357,540, a process is described for preparing polymeric particles by a stable free radical polymerization ("SFRP") process wherein the polymeric particles contain covalently bound functional groups on the particle surface. An advantage of the SFRP process is that the resulting resin has narrow polydispersities. According to U.S. Ser. No. 10/357,540, page 12, lines 8–11, the presence of functional groups on the surface of the polymeric particles is advantageous for chemical toner fabrication because the surface charges allow for aggregants to react with them and thus result in latex aggregation from nanometer sized particles to micrometer sized chemical toner.

There is a need, which the present invention address, for toner fabrication processes that incorporates the polymeric particles prepared by SFRP into toner.

Exemplary polymerization processes and toner fabrication processes (particularly emulsion/aggregation/coalescing processes for the preparation of toners) are described in the following:

U.S. Pat. No. 5,686,518.
U.S. Pat. No. 5,852,140.
U.S. Pat. No. 5,403,693.
U.S. Pat. No. 5,994,020.
U.S. Pat. No. 5,589,313.
U.S. Pat. No. 6,132,924.
U.S. Pat. No. 6,268,102.
U.S. Pat. No. 5,922,501.
U.S. Pat. No. 5,945,245.

Jose M. Asua, "Miniemulsion polymerization," *Progress in Polymer Science* 27 (2002), pp. 1283–1346.

Ignac Capek et al., "Radical Polymerization in Direct Mini-Emulsion Systems," *Advances in Polymer Science* (2001), Vol. 155, pp.101–165.

BRIEF SUMMARY

There is provided in embodiments a process of preparing a chemical toner comprising:

(a) mixing together a latex and a first composition to result in a second composition, wherein the first composition includes a colorant dispersion and an optional wax dispersion, wherein the latex comprises polymeric particles dispersed in an aqueous phase, wherein the polymeric particles comprise a compound with a functional group covalently bound and with the functional group disposed on the particle surface, wherein the compound exhibits a molecular weight polydispersity of from about 1.1 to about 3.0;

(b) heating the second composition at an aggregation temperature which is at or below the glass transition temperature of the polymeric particles to form toner sized aggregates;

(c) adding a coagulant to the second composition prior to or during the heating of the second composition at the aggregation temperature to promote formation of the toner sized aggregates;

(d) stabilizing the particle size of the toner sized aggregates, resulting in a stabilized composition; and (e) heating the stabilized composition at a coalescence temperature which is above the glass transition temperature of the polymeric particles to coalesce the toner sized aggregates into toner particles.

There is also provided in embodiments, a chemical toner comprising:

(a) a resin including a compound which exhibits a molecular weight polydispersity of from about 1.1 to about 3.0;

(b) an optional wax; and (c) a colorant, wherein the particle size of the chemical toner exhibits a geometric standard deviation of about 1.25 or less.

DETAILED DESCRIPTION

The terms "resin" and "resin particles" are used interchangeably with "polymer" and "polymeric particles" respectively.

The present process in embodiments involves preparing toner compositions by a chemical process, such as emulsion aggregation wherein resin particles (produced by SFRP and including a compound having a narrow molecular weight polydispersity that is characteristic of SFRP) are aggregated with a colorant dispersion and a wax dispersion in the presence of a coagulant; heating at or below the glass transition temperature ("Tg") of the resin to provide toner sized aggregates, followed by addition of a base, and thereafter heating above the resin Tg to provide coalesced toner particles.

More specifically, the resin particles used in the present process is prepared by stable free radical polymerization using for example a modified mini-emulsion process as described for instance in copending application, U.S. Ser. No. 10/357,540, the disclosure of which is totally incorporated herein by reference. The following exemplary procedures may be employed to prepare the resin particles. First, the desired monomers are polymerized (in a bulk system) in the presence of a nitroxide to afford a low conversion bulk solution. Second, this bulk solution is then emulsified (with high shear device) in the presence of surfactant, additional water-soluble initiator, water-soluble monomers and nitroxide resulting in particles of the desired size. Third, this latex is then heated to temperatures greater than about 100 degrees C. to give resin particles of high conversion having covalently bound functional groups on the particle surface. In embodiments of the present process, these SFRP resin particles are aggregated with a wax dispersion and colorant dispersion, in the presence of a coagulant such as a polymetal halide, or optionally a cationic surfactant, thereafter stabilizing the aggregates with a solution of base and thereafter coalescing by heating the mixture above the resin Tg to provide toner particles.

In embodiments of the present process, the following exemplary procedures are employed:

(a) preparing the resin particles by first prepolymerizing the monomers by bulk polymerization, followed by emulsification of the prepolymer in the presence of a surfactant (such as an anionic surfactant), functional monomers (such as carboxylic acids), and initiators, and heating to provide an emulsion by SFRP where said resin particles contain covalently bound functional groups on the particle surface; and (b) aggregating the resin particles with a wax dispersion and colorant dispersion, in the presence of a coagulant such as a polymetal halide, or optionally a cationic surfactant, thereafter stabilizing the aggregates with a solution of anionic surfactant and thereafter coalescing by heating the mixture above the resin Tg at a pH of about 2.0 to about 3.0 to provide toner particles.

In embodiments, the present process comprises mixing a latex containing resin particles dispersed in an aqueous phase (wherein the resin particles include a compound with a covalently bound functional group), a colorant dispersion, a wax dispersion, in the presence of a coagulant. The resin particles are prepared by Stable Free Radical Polymerization which comprises first preparing a partially converted prepolymer by bulk polymerization, followed by dispersing said prepolymer in an aqueous anionic surfactant containing a functional monomer (i.e., a monomer having a functional group), and a water soluble initiator. This mixture is polymerized for the second time at a temperature of for example about 135 degrees C. to provide a latex containing suspended submicron size resin particles with functional groups attached covalently to the particle surface. The functional groups on the resin particles provide a means of aggregating the submicron resin particles with other colorants, wax particles in the presence of a cationic coagulant to form toner particles with narrow particle size distribution.

In embodiments, exemplary procedures for carrying out the present process are the following:

(a) a colorant dispersion containing colorant, water and an ionic surfactant, or a non-ionic surfactant, is added to a wax dispersion comprised of submicron wax particles (ranging for example from about 0.1 to about 0.5 micron in diameter by volume), water, and an ionic surfactant, to result in a mixture containing a colorant and a wax;

(b) a latex composed of (1) SFRP produced resin particles where the resin particles include a compound with covalently bound functional groups on the particle surface, the resin particles having a size ranging for example from about 150 to about 300 nm, (2) water, and (3) an ionic surfactant or a non-ionic surfactant, where the latex possesses a pH of about 4.5 to about 5.5, is pH adjusted to about pH 2.7 to about pH 2.9 using for example 0.3 molar HNO3 solution;

(c) the mixture of feature (a) is blended with the latex of feature (b), to provide a blend of colorant, wax and SFRP resin particles;

(d) the resulting blend of feature (c) possesses a pH of about 2.4 to about 3.2 to which is added a coagulant such as a poly metal halide or a cationic surfactant to initiate aggregation of the blend components;

(e) heating the resulting mixture of feature (d) at an aggregation temperature which is at or below the Tg of the resin particles to form toner sized aggregates;

(f) stabilizing the particle size of the toner size aggregates by adding: (1) an ionic surfactant and/or a non-ionic surfactant, or (2) an aqueous solution of a base to thereby change the pH, which is initially from about 2.4 to about 3.2, to arrive at a pH of from about 7.0 to about 7.4, or (3) a combination of (1) and (2), resulting in a stabilized composition;

(g) heating the stabilized composition of feature (f) at a coalescence temperature which is above the Tg of the resin particles, and maintaining the coalescence temperature at for example from about 80° C. to about 95° C. for a time period of about 1 to about 6 hours to facilitate coalescence of the toner sized aggregates and to obtain toner particles having a smooth surface, thereby resulting in a toner slurry;

(h) washing the resulting toner slurry; and (i) isolating the toner particles and drying them.

In other embodiments of the present invention, exemplary procedures for carrying out the present process are the following:

(a) a colorant dispersion containing colorant, water and an ionic surfactant, or a non-ionic surfactant, is added to a wax dispersion comprised of submicron wax particles (ranging for example from about 0.1 to about 0.5 micron in diameter by volume), water, and an ionic surfactant, to result in a mixture containing a colorant and a wax;

(b) a first latex composed of (1) SFRP produced resin particles where the resin particles include a compound with covalently bound functional groups on the particle surface, the resin particles having a size ranging for example from about 150 to about 300 nm, (2) water, and (3) an ionic surfactant or a non-ionic surfactant, where the latex possesses a pH of about 4.5 to about 5.5, is pH adjusted to about pH 2.7 to about pH 2.9 using for example 0.3 molar HNO3 solution;

(c) the mixture of feature (a) is blended with the latex of feature (b), to provide a blend of colorant, wax and SFRP resin particles;

(d) the resulting blend of feature (c) possesses a pH of about 2.4 to about 3.2 to which is added a coagulant such as a poly metal halide or a cationic surfactant to initiate aggregation of the blend components;

(e) heating the resulting mixture of feature (d) at an aggregation temperature which is at or below the Tg of the resin particles to form toner sized aggregates;

(f) adding during the heating at the aggregation temperature of feature (e) a second latex composed of: (1) the same SFRP produced resin particles as used in the first latex of feature (b), (2) water, and (3) an ionic surfactant;

(g) stabilizing the particle size of the toner sized aggregates subsequent to feature (f) by adding: (1) an ionic surfactant and/or a non-ionic surfactant, or (2) an aqueous solution of a base to thereby change the pH, which is initially from about 2.4 to about 3.2, to arrive at a pH of from about 7.0 to about 7.4, or (3) a combination of (1) and (2), resulting in a stabilized composition;

(h) heating the stabilized composition of feature (g) at a coalescence temperature which is above the Tg of the resin particles, and maintaining the coalescence temperature at for example from about 80° C. to about 95° C. for a time period of about 1 to about 6 hours to facilitate coalescence of the toner sized aggregates and to obtain toner particles having a smooth surface, thereby resulting in a toner slurry;

(i) washing the resulting toner slurry; and (j) isolating the toner particles and drying them.

In other embodiments, the second latex of feature (f) includes SFRP produced resin particles different from those used in the first latex of feature (b). The different SFRP produced resin particles of the second latex contains a different compound ("Different Compound") with a covalently bound functional group and exhibiting a molecular weight polydispersity value ranging from about 1.1 to about 3.0. This Different Compound may differ from the compound of the first latex in for example the type of functional group, the molecular weight polydispersity value, or the like. The Different Compound may be prepared using the same materials and methods as described herein for the compound of the first latex.

The second latex is added to form a shell around the toner sized aggregates. Typically, the shell spontaneously forms around the toner sized aggregates after addition of the second latex. In embodiments, the second latex can be added when the aggregated particles are about 60% to about 95% of the size of the coalesced particles (or about 80% to about 90% of the size of the coalesced particles), wherein the aggregating produces the aggregated particles including a shell comprised of aggregated additional polymeric particles. The aggregated additional polymeric particles in the shell may contain either the same compound of the first latex or the Different Compound. The shell has a thickness ranging for example from about 0.05 to about 1 micrometers (determined from the coalesced particles). In embodiments, the composition of the shell differs from that of the core in that the shell may be composed entirely of aggregated additional polymeric particles; in embodiments, the shell may include one or more of the other ingredients of the toner composition but in a proportion less than that of the core. When subjected to the coalescing feature of the present process, the aggregated additional polymeric particles in the shell coalesces to result in coalesced additional polymeric particles in the shell. The purpose of the shell is to cover the colorant particles within the core so that the colorant particles will therefore not affect charging of the final toner particle.

In embodiments, the colorant particles (which may be a pigment) are present in amounts of from about 1 percent by weight to about 20 percent by weight, based on the total weight of the toner composition; the wax particles are present in amounts of from about 2 percent by weight to about 20 percent by weight, based on the total weight of the toner composition; the resin particles are present in an amount ranging for example from about 35 to about 95 weight percent based on the total weight of the toner composition; wherein the said components add to 100 percent to provide a toner composition.

In embodiments, the resin is present in an amount of from about 65 to about 97 weight percent, the wax is present in an amount of from 0 to about 15 weight percent, and the colorant is present in the amount of 3 to about 15 weight percent based on the toner.

The resin particles are in the size range of about 25 nanometers to about 1000 nanometers and preferably in the range of about 50 nanometers to about 500 nanometers. The latex dispersion (including the resin particles) can be stabilized with an anionic surfactant for example sodium dodecylbenzenesulphonate, or optionally with a non-ionic surfactant for example polyethylene oxide.

The colorant particles are in the size range of about 10 nanometers to about 400 nanometers. The colorant dispersion can be stabilized with an anionic surfactant for example NEOGEN RK®, or optionally with a non-ionic surfactant for example polyethylene nanophenyl ether.

The wax particles are in the size range of about 10 nanometers to about 400 nanometers. The wax dispersion can be stabilized with an anionic surfactant for example NEOGEN RK®, or optionally with a non-ionic surfactant for example polyvinyl alcohol.

In embodiments, the present invention is related to the preparation of a bulk stable free radical polymerization, utilizing monomers, for example A and B wherein A is in the range of about 1 to about 99 weight percent and B is in the range of about 99 to about 1 weight percent by weight of polymer. The initiator employed is in the range of 0.05 to about 0.00025 mole percent by weight of monomer, wherein the bulk polymerization temperature is in the range of about 80 to about 150 deg C. to provide a resin with a conversion of about 5 to about 30 percent. The latex is prepared by emulsifying the prepared bulk resin, in an aqueous phase containing anionic surfactant, initiator, and monomers having functional groups using known shearing devices. The emulsification is carried out at solids loading of about 10 to about 40 percent. The surfactant concentration is in the range of about 0.1 to about 5.0 weight percent by weight of toner, while the functional group resulting either from the initiator or the monomer is in the range about 0.5 to 20 percent by weight of resin.

The present process may be used to prepare a variety of polymeric materials, including for example toner particles for use in liquid and dry developer marking applications in a cost efficient manner. An advantage of the present process is that various embodiments thereof may afford control over the particle size, particle size distribution properties of the resulting fine particulate products, and precise control over the molecular weight and molecular weight distribution properties of the resulting polymer products. Additionally, the present invention provides in embodiments superior latex formation processes with substantially quantitative conversion, or yield, of polymer product and with unexpectedly low residual monomer. In embodiments, the functional group allows for the stability of the particles and also manipulation of the particle size by reducing the charge (by example through pH) and allowing for aggregation. The presence of functional groups on the surface of the polymeric particles is advantageous for chemical toner fabrication. The surface charges allow for aggregants to react with them and thus result in latex aggregation from nanometer sized particles to micrometer sized chemical toner.

In embodiments, the present invention relates to a stable free radical moderated miniemulsion polymerization process for producing a polymer resin or resins, that have narrow polydispersities, that is, narrow molecular weight distributions as defined by the ratio Mw:Mn, where Mw is weight average molecular weight of the polymer and Mn is number average molecular weight of the polymer, with an easily controlled modality.

The present process involves heating the first mixture composed of at least one free radical polymerizable monomer, a first free radical initiator, and a stable free radical compound to polymerize only a portion of the monomer, resulting in a prepolymer composition.

The heating of the first mixture can be at a polymerization temperature ranging for example from about 110 to about 145 degrees C. for a time ranging for example from about 5 minutes to about 4 hours, particularly from about 20 minutes to about 1 hour.

The molar ratio of the stable free radical compound (SFR) to radicals from the first free radical initiator (INIT1) is for example from about 0.8(SFR):1.2(INIT1) to about 1(SFR):1(INIT1).

In embodiments, in the first mixture, the molar ratio of free radical polymerizable monomer (total of all types) to stable free radical compound (total of all types) to radicals from the free radical initiator (total of all types) is for instance from about 50:2:1 to about 10,000:2.5:1 and particularly in the range of about 300:1.3:1 to about 7,000:1.8:1.

In the first mixture, each ingredient (e.g., monomer, initiator, and stable free radical compound) may be of only one type or may be composed of two or more types. Where the ingredient is composed of two or more types, each ingredient type may be present at any suitable molar ratio such as at a molar ratio ranging for example from about 99(first type of one ingredient):1(second type of the same ingredient) to about 1(first type of one ingredient):99(second type of the same ingredient).

In embodiments, the ingredients of the first mixture and the heating conditions for the first mixture are selected in order to perform a bulk polymerization or solution polymerization of the first monomer to low conversion, where the conversion rate is described herein.

A second mixture is subjected to shearing to create a miniemulsion, wherein the second mixture is composed of at least the prepolymer composition, a continuous phase liquid, and a stabilizing compound. There is added to the second mixture, the miniemulsion, or both the second mixture and the miniemulsion at any time prior to the formation of the polymeric particles a number of additional ingredients (referred as "Additional Ingredients") such as for instance a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface. In embodiments, all of the Additional Ingredients can be added to the second mixture prior to the shearing. In other embodiments, all of the Additional Ingredients are added to the miniemulsion. In still other embodiments, one or more of the Additional Ingredients is added to the second mixture, while the rest of the Additional Ingredients is added to the miniemulsion. In further embodiments, a portion of a single Additional Ingredient may be added to the second mixture while the remaining amount of that single Additional Ingredient is added to the miniemulsion. All manners of adding the Additional Ingredients are encompassed within the present process.

The shearing can be accomplished by a variety of high shear mixing devices, for example, a piston homogenization, a microfluidizer, a polytron, an ultrasonicator, and the like devices. In embodiments, the miniemulsion may be formed for instance in a piston homogenizer at for example from about 1 to about 60 minutes at a pressure for instance of about 1,000 to about 30,000 psi. The miniemulsion prior to its heating is composed of droplets of the prepolymer composition with a volume average diameter, for example, of from about 25 nanometers to about 1 micrometer, particularly from about 100 to about 400 nanometers.

Illustrative molar percentages of the ingredients in the second mixture/miniemulsion are as follows:

(1) The second free radical polymerizable monomer is present in an amount for example from about 1% to about 25% molar relative to the first monomer (based on 100 moles of the first monomer), and particularly from about 5% to about 10% molar relative to the first monomer.

(2) The second free radical initiator may be present in an amount for example from about 0.1% to about 0.01% molar relative to the second monomer (based on 100 moles of the second monomer).

(3) The optional second stable free radical compound may be present for example at a molar ratio to radicals from the second initiator of from about 0.8 to about 1.2.

(4) The stabilizing compound may be present for example in the range of about 0.2% to about 5% (weight/weight to the continuous phase liquid).

(5) The continuous phase liquid may be present for example in the range of about 50% to about 90% by weight relative to all the hydrophobic ingredients in the second mixture (e.g., polymerized monomers, unreacted monomers and any waxes).

In the second mixture/miniemulsion, each ingredient (e.g., prepolymer composition, continuous phase liquid, stabilizing compound, monomer, stable free radical compound, and initiator) may be of only one type or may be composed of two or more types. Where the ingredient is composed of two or more types, each ingredient type may be present at any suitable molar ratio such as at a molar ratio ranging for example from about 99(first type of one ingredient): 1(second type of the same ingredient) to about 1(first type of one ingredient):99(second type of the same ingredient).

The miniemulsion is heated to result in polymeric particles each including a compound with the functional group wherein the functional group is covalently bound and is disposed on the particle surface.

The heating of the second mixture can be at a polymerization temperature ranging for example from about 110 to about 145 degrees C. for a time ranging for example from about 2 hours to about 8 hours, particularly from about 4 hours to about 6 hours. The heating conditions can vary depending on, for example, the scale of the reaction and the results desired.

The present process, in embodiments, provide for high monomer to polymer conversion levels, or degrees of polymerization, for example, of about 90 percent by weight or greater, or from about 95 to 100 percent, and particularly from about 98 to about 100 percent (the conversion percentages refer to all monomers employed in the present process). After heating of the miniemulsion to the second polymerization temperature to form the polymeric particles, the resulting composition containing the polymeric particles is considered a latex or emulsion.

The phrase "functional group" refers to: (1) a "functional charged group" which presently contains a positive or negative charge; and (2) a "functional neutral group" which presently is neutral but can be induced by ionization to result in a positive or negative charge. Ionization can be induced by for example heating, electrical potential, changing pH, and the like. For example, a carboxylic acid as the functional neutral group can be taken to a basic pH to generate the carboxylate functional charged group. The functional neutral group can be, but is not limited to, for example carboxylic acids, sulphonic acids, phosphates, amines and the like. The functional charged group can be for example carboxylates, sulfonates, phosphates, quaternary amines, and the like. The substituents on the functional group can be aromatic, aliphatic or combinations thereof.

There may be a single compound with the functional group in the polymeric particles or a mixture of two or more different compounds with the same or different functional group in the polymeric particles. In embodiments, there can be a single compound with two or more different functional groups, where such compounds are typically called zwitterions and contain for instance a carboxylic acid and an amine. For example, amino acids are zwitterions because upon ionization the hydrogen from the carboxylic acid goes on the nitrogen and the molecule now contains both a positive and negative charge.

The polymeric particles are composed of a compound whose characteristics are now discussed. The compound may have any number of repeating units such as for example from about 10 to about 30,000, or from about 50 to about 200. The weight average molecular weight (Mw) of the compound can be, for example, from about 1,000 to about 3,000,000, and particularly about 10,000 to about 150,000. The compound can have a narrow polydispersity, for example, of from about 1.1 to about 3.0, from about 1.1 to about 2.0, or from about 1.05 to about 1.45. The polymeric particles have a volume average diameter, for example, of from about 25 nanometers to about 1 micrometer, particularly from about 100 to about 600 nanometers.

To form the toner sized aggregates, heating of the dispersion may occur for any suitable time ranging for example from about 30 minutes to about 20 hours or from about 1 hour to about 5 hours. The aggregation temperature may be kept at one value or varied among two, three or more values during the formation of the toner sized aggregates. The aggregation temperature may be for example no higher than the glass transition temperature of the polymeric particles, that is, below or at the glass transition temperature of the polymeric particles. In embodiments, the aggregation temperature is for example about 1 to about 20 degrees C. below the glass transition temperature of the polymeric particles or from about 1 to about 10 degrees C. below the glass transition temperature of the polymeric particles. In embodiments, the aggregation temperature ranges for example from about 29 to about 49 degrees C., or from about 39 to about 49 degrees C.

In embodiments, the polymeric particles have a glass transition temperature ranging from about 45° C. to about 80° C.

The ingredients of the toner composition may be added in any effective order. Various exemplary processes with particular sequences of performance are described herein. But any suitable sequence of performance are encompassed within the present invention. In one embodiment, all the ingredients are present except for the coagulant which is added while shearing the toner mixture using a polytron at a shear rate from about 1000 to about 8000 RPM. The coagulant is added at the rate of about 10 to about 50 weight percent per minute or about 25 to about 35 weight percent per minute.

Illustrative molar percentages of the toner composition ingredients (based on the weight of the toner composition) are as follows:

(a) The polymeric particles are present in an amount ranging for example from about 35 to about 95 weight percent, or from about 40 to about 65 weight percent.

(b) The optional additional polymeric particles (for the optional shell) are present in an amount ranging for example from about 10 to about 35 weight percent, or from about 15 to about 30 weight percent.

(c) The colorant is present in an amount ranging for example from about 1 to about 20 weight percent, or from about 2 to about 10 weight percent.

(d) The coagulant as a polymetal halide is present in an amount ranging for example from about 0.1 to about 0.3 weight percent, or from about 0.1 to about 0.2 weight percent; the coagulant as a cationic surfactant is present in an amount ranging for example from about 0.4 to about 3.0 weight percent, or from about 0.5 to about 2.0 weight percent.

(e) The wax is present in an amount ranging for example from about 2 to about 20 weight percent, or from about 5 to about 15 weight percent.

(f) The optional charge control additive is present in an amount ranging for example from about 0.1 to about 10 weight percent, or from about 2 to about 7 weight percent. As clarification, this category (f) of the optional charge control additive is directed to those charge control additives that are internally incorporated into the toner particles in contrast to external charge control additives that reside on the surface of the toner particles. External charge control additives are also described herein.

Each ingredient of the toner composition (e.g., polymeric particles, colorant, coagulant, optional wax, and optional charge control additive) may be of only one type or may be composed of two or more types. Where the ingredient is composed of two or more types, each ingredient type may be present at any suitable molar ratio such as at a molar ratio ranging for example from about 99(first type of one ingredient):1(second type of the same ingredient) to about 1(first type of one ingredient):99(second type of the same ingredient).

The present process involves stabilizing the particle size of the toner sized aggregates prior to the coalescing. The phrase "stabilizing the particle size of the toner sized aggregates" refers to preventing or minimizing further growth in the size of the aggregates where in embodiments the toner particles exhibit a geometric standard distribution (GSD) of about 1.25 or less, a GSD ranging from about 1.18 to about 1.25, or a GSD ranging from about 1.23 to about 1.25. The GSD values recited herein are determined on the toner particles, i.e., after coalescence of the toner sized aggregates into toner particles. In embodiments, the GSD values recited herein can be achieved without the need for the toner particles to undergo a classification process (i.e., sorting by size). Any suitable technique may be used in stabilizing the particle size of the toner sized aggregates such as either or both of the following techniques: (1) adding an ionic surfactant prior to the heating at the coalescence temperature; and (2) changing the pH (such as adding a base to make more basic) of the second composition prior to the heating at the coalescence temperature. In embodiments, stabilizing the particle size of the toner sized aggregates may be accomplished for example by adjusting the pH of the dispersion containing the toner sized aggregates to about 5 to about 9 by adding a base, or by the addition of an anionic surfactant such as for example NEOGEN RK®, in the amount of about 0.5 to about 10 percent by weight of the toner composition.

The coalescing the toner sized aggregates involves heating the toner sized aggregates at a coalescence temperature that is above the glass transition temperature of the polymeric particles to result in the toner particles. In embodiments, the coalescence temperature ranges for example from about 3 to about 60 degrees C., or from about 5 to about 40 degrees C., above the glass transition temperature of the polymeric particles. In embodiments, the coalescence temperature ranges for example from about 70 to about 130 degrees C., or from about 70 to about 110 degrees C. The coalescence temperature is maintained for a time period ranging for example from about 30 minutes to about 10 hours, or from about 1 hour to about 6 hours. The coalescence temperature may be kept at one value or varied among two, three or more values during the coalescence of the toner sized aggregates into toner particles.

The coalesced toner particles may be optionally washed using deionized water at a temperature ranging from about 20 to about 63 degrees Centigrade, wherein the toner slurry is optionally pH adjusted to a pH from about pH 4 to about pH 10.

The coalesced toner particles can then be isolated by for example separating the toner particles from the liquid phase, where such separation can be accomplished by conventional methods such as filtration, sedimentation, spray drying, and the like.

The toner particles in embodiments may be subjected to further processing to provide or enhance desirable characteristics. For example, the toner particles may be mixed with one or more additives such as a charge control additive and/or a flow additive to adhere such additive or additives to the particle surface.

Illustrative examples of resins suitable for toner and developer compositions include branched styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

With regards to monomers useful in the present invention which include a functional group, they can be acrylic acid and its derivatives of the formula ($CH_2$=CH)COOR—COOH (where the R group can be a spacer aliphatic group to for example impart different hydrophilicity); maleic acid and its derivatives of the formula R',R"-maleicacid (as for example phthalic anhyride, wherein one of R' and R" is an aromatic group and the other is an aliphatic group, or R' and R" are the same or different aromatic group, or R' and R" are the same or different aliphatic group); styrenic monomers (such as styrenesulfonic acids, 4-vinylbenzoic acids); methacrylic acid and its derivatives of the formula ($CH_2$=$CCH_3$)COORCOOH (where the R group can be a spacer aliphatic group to for example impart different hydrophilicity); and a diene such as for example isoprene and butadiene; and the like. The term "aliphatic group" refers to for example from 1 to about 14 carbon atoms, particularly straight chain and branched alkyl groups.

In embodiments, the compound is selected from the group consisting of: poly(styrene-alkyl acrylate), poly(styrene-1, 3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylonitrile).

In embodiments, the compound is polymerized from a carboxylic acid selected from the group consisting of acrylic acid, methacrylic acid, itaconic acid, beta carboxy ethyl acrylate, fumaric acid, maleic acid, cinnamic acid, and mixtures thereof.

With regards to initiators useful in the present invention which include a functional group (where such initiators in embodiments may be soluble in the continuous phase liquid), any suitable free radical initiator may be employed such as hydrogen peroxide, t-butyl hydroperoxide, 2,2'-azobis(2-amidinopropane)dihydrochloride, 2,2'-azobis(2-methylpropionamidine)dihydrochloride, 4,4'azobis(4-cyanovaleric acid), 4,4'-azobis(4-cyanopentanoic acid), potassium persulfates and aminopersulfates.

Anionic surfactants and cationic surfactants are encompassed by the term "ionic surfactant."

Examples of anionic surfactants include, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN RK™, NEOGEN SC™ from Kao and the like. An effective concentration of the anionic surfactant generally employed is, for example, from about 0.01 to about 10 percent by weight, and preferably from about 0.1 to about 5 percent by weight of monomers used to prepare the toner resin.

Examples of the cationic surfactants, which are usually positively charged, selected for the toners and processes of the present invention include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof. A suitable amount of surfactant can be selected, such as from about 0.2 to about 5 percent by weight of the toner components.

Examples of non-ionic surfactants that may be, for example, included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®. A suitable concentration of the non-ionic surfactant is, for example, from about 0.01 to about 10 percent by weight, and preferably from about 0.1 to about 5 percent by weight of monomers used to prepare the toner polymer resin.

The coagulant may be comprised of organic, or inorganic entities and the like. For example, in embodiments the ionic surfactant of the resin latex dispersion can be an anionic surfactant, and the counterionic coagulant can be a polymetal halide or a polymetal sulfo silicate (PASS). Coagulants that can be included in amounts of, for example, from about 0.05 to about 10 weight percent (based on the weight of the toner) include polymetal halides, polymetal sulfosilicates monovalent, divalent or multivalent salts optionally in combination with cationic surfactants, and the like. Inorganic cationic coagulants include, for example, polyaluminum chloride (PAC), polyaluminum sulfo silicate (PASS), aluminum sulfate, zinc sulfate, magnesium sulfate, and mixtures thereof. In embodiments, the coagulant is a cationic surfactant as described herein.

The toner particles illustrated herein may also include known charge additives in effective amounts of, for example, from 0.1 to 5 weight percent such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like.

Surface additives that can be added to the toner compositions after washing or drying include, for example, metal salts, metal salts of fatty acids, colloidal silicas, metal oxides, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Specific additives include zinc stearate and AEROSIL R972® available from Degussa Chemical and present in an amount of from about 0.1 to about 2 percent which can be added during the aggregation process or blended into the formed toner product.

In toner compositions, the resin particles (i.e., the polymeric particles) are present in a sufficient but effective amount, for example from about 70 to about 90 weight percent. Thus, when 1 percent by weight of the charge-enhancing additive is present, and 10 percent by weight of pigment or colorant, such as carbon black, is contained therein, about 89 percent by weight of resin is selected. Also, the charge-enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be themselves surface treated with the charge additives in an amount of from about 1 to about 30 weight percent and preferably 10 weight percent followed by the addition thereof to the toner in an amount of from about 0.1 to about 10 or from about 0.1 to about 1 weight percent.

The wax and wax dispersion are optional. When present in the toner particles, the wax may function as a fuser roll release agent. The wax is for example alkylenes, like polyethylene, polypropylene waxes, and mixtures thereof having a low molecular weight of from between about 1,000 to about 20,000 in amounts of from about 0.1 to about 15 weight percent of the total monomer polymerized. The wax may be incorporated into the toner particles at any stage of the fabrication process such as adding the wax to the polymeric particles of the process. Suitable low molecular weight waxes are disclosed in U.S. Pat. No. 4,659,641, the disclosure of which is totally incorporated herein by reference. There can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Examples of functionalized waxes include, such as amines, amides, for example AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and SC Johnson wax. Many of the polyethylene and polypropylene compositions useful in the present invention are illustrated in British Patent No. 1,442,835, the disclosure of which is totally incorporated herein by reference.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methyl methacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner and developer compositions may be selected for use in electrostatographic imaging apparatuses containing therein conventional photoreceptors providing that they are capable of being charged positively or negatively.

The toner compositions may have toner particles with an average diameter of for example from about 5 to about 25 microns, from about 8 to about 12 microns, or from about 5 to about 8 microns. Also, the toner compositions may possess a triboelectric charge of for example from about 0.1 to about 2 femtocoulombs per micron as determined by the known charge spectrograph. Admix time for toners are for example from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared, in embodiments, of the present invention possess desirable narrow charge distributions, optimal charging triboelectric values, such as for example of from 10 to about 40, or from about 10 to about 35 microcoulombs per gram as determined by the known Faraday Cage methods with from about 0.1 to about 5 weight percent in one embodiment of the charge control additive; and rapid admix charging times as determined in the charge spectrograph of for example less than 15 seconds, or in some embodiments from about 1 to about 14 seconds.

The invention will now be described in detail with respect to specific embodiments thereof, it being understood that these examples are intended to be illustrative only and the invention is not intended to be limited to the materials, conditions, or process parameters recited herein. All percentages and parts are by weight unless otherwise indicated. "Room temperature" refers to a temperature ranging from about 20 to about 30 degrees C.

EXAMPLE 1

Preparation of Latex Containing Polymeric Particles

Stage 1: Bulk Prepolymer Preparation

About 1062 g styrene (Rohm and Haas) and 303.3 g n-butyl acrylate (Rohm and Haas) were charged into a 2-L stainless steel Buchi reactor. Mixing was started at a rate of 500 RPM using a 2 inch diameter stainless steel pitch-blade impeller, and this was maintained throughout the reaction. About 17.8 g TEMPO (Z.D. Chemipan) was added to the mixture and stirred for 5 minutes to dissolve. About 14.7 g 1,1'-azobis(cyanocyclohexane) initiator (Vazo-88; Dupont Chemicals) was added to the mixture and stirred for 5 minutes to dissolve. Nitrogen was bubbled through the mixture at a rate of 5 standard cubic feet per hour ("SCFH") throughout the reaction. The reactor was heated up to 135° C., and this temperature was maintained for 90 minutes. The reactor was then cooled to room temperature and reactor contents were discharged into a stainless steel beaker. The solution contained 20.1 wt % polymer solids as measured gravimetrically. The polymer solids had the following molecular weight characteristics as measured by gel permeation chromatography: Mn=2175, Mw=2592, Polydispersity=1.19. This product is hereafter refered to as "bulk prepolymer."

Stage 2: Latex A Preparation

About 1262 g deionized water was charged into a 2-L stainless steel beaker, and mixing was started at a rate of 500 RPM using a 2-inch diameter stainless steel pitch-blade impeller. About 19 g dodecylbenzenesulfonic acid sodium salt ("SDBS"; Aldrich) and 1.5 g sodium persulfate (Aldrich) were added to the water and mixed for 5 minutes to dissolve. About 286.6 g 'bulk prepolymer' (prepared according to Example 1, Stage 1), 20 g acrylic acid (Aldrich), and 2.0 g TEMPO (Z.D. Chemipan) were added to the mixture and stirred for 5 minutes. The mixture was then passed through a Niro-Soavi piston homogenizer that was set at a pressure between 400 BAR to 600 BAR. The mixture was then charged into a 2-L stainless steel Buchi reactor equipped with a 2-inch stainless steel pitch-blade impeller. Agitation was started at 500 RPM, and this was maintained throughout the reaction. The reactor was sealed and heated up to 135° C., and this temperature was maintained for 5.5 hours. After 30 minutes at 135° C., a mixture of 1.5 g ascorbic acid and 119 g deionized water was fed into the reactor at a rate of 0.5 grams per minute using a piston pump. After 5.5 hours at 135° C., the reactor was cooled to room temperature and reactor contents were discharged into a 2-L stainless steel beaker. The final latex contained 18.0 wt % polymer solids as measured gravimetrically. Volume average particle size was 156 nm as measured by a NICOMP light scattering device. About 233 ppm residual styrene and 197 ppm residual n-butyl acrylate were measured by gas chromatography. The polymeric particles had the following molecular weight characteristics as measured by gel permeation chromatography: Mn=11074, Mw=14297, Polydispersity=1.29. Onset glass transition temperature of the polymeric particles was 51.6° C. as measured by differential scanning calorimetry.

EXAMPLE 2

Toner Preparation Using PAC Aggregant Containing 5% Cyan Pigment, 9% Wax, Base Stabilized About 436 grams of the above prepared Latex A of Example 1 was added to 167.5 milliliters of water. The pH of this mixture was adjusted from 4.5 to 2.8 using 0.3M $HNO_3$. Then 39 gms of P725 wax dispersion having a solids content of 31 percent, and 26.3 gm of a Blue Pigment PB 15:3 dispersion having a solids content of 26.5 percent were simultaneously added to with high shear stirring by means of a polytron. To this mixture was added 19.5 gm of a coagulant solution consisting of 1.95 grams of polyaluminum chloride and 17.55 grams of a 0.02M solution of $HNO_3$. During addition of the coagulant solution the mixture was blended at a speed of 3,000 rpm and held for a period of 2 minutes after coagulant addition. The resulting mixture was transferred to a 2 liter reaction vessel and stirred at 400 rpm. This solution was then heated to a temperature of 48° C. After 90 minutes at a temperature of 48 deg C., this resulted in an aggregate size of about 4.45 microns and a GSD of 1.22. About 210.5 grams of Latex A was pH adjusted from 4.5 to 2.8 using 0.3M $HNO_3$. This was then added to the reactor as a shell portion. After an additional 30 minutes, this resulted in an aggregate size of 5.47 and a GSD of 1.23. The pH of the resulting mixture was then adjusted from 2.8 to 7.0 with an aqueous base solution of 4 percent sodium hydroxide. Subsequently, the resulting mixture was heated to 90° C. and retained there for a period of 1 hour at pH 7. The morphology of the toner particles was spherical. The particle size measured was 5.70 microns with a GSD of 1.25. The reactor was then cooled down to room temperature and the particle were washed 5 times, where the first wash was conducted at pH of 11 at room temperature, followed by 4 washes with deionized water at room temperature.

EXAMPLE 3

Toner Preparation Using PAC Aggregant Containing 5% Cyan Pigment, Base Stabilized About 492 grams of the above prepared Latex A of Example 1 was added to 194.7 milliliters of water. The pH of this mixture was adjusted from 4.5 to 2.8 using 0.3M $HNO_3$. Then 26.3 gm of a Blue Pigment PB 15:3 dispersion having a solids content of 26.5 percent were simultaneously added to with high shear stirring by means of a polytron. To this mixture was added 19.5 gm of a coagulant solution consisting of 1.95 grams of polyaluminum chloride and 17.55 grams of a 0.02M solution of $HNO_3$. During addition of the coagulant solution the mixture was blended at a speed of 3,000 rpm and held for a period of 2 minutes after coagulant addition. The resulting mixture was transferred to a 2 liter reaction vessel and stirred at 400 rpm. This solution was then heated to a temperature of 48° C. After 90 minutes at a temperature of 48 deg C., this resulted in an aggregate size of about 4.45 microns and a GSD of 1.22. About 210.5 grams of Latex A was pH adjusted from 4.5 to 2.8 using 0.3M $HNO_3$. This was then added to the reactor as a shell portion. After an additional 30 minutes, this resulted in an aggregate size of about 5.47 and a GSD of 1.23. The pH of the resulting mixture was then adjusted from 2.8 to 7.0 with an aqueous base solution of 4 percent sodium hydroxide. Subsequently, the resulting mixture was heated to 90° C. and retained there for a period of 1 hour at pH 7. The morphology of the toner particles was spherical. The particle size measured was 5.70 microns with a GSD of 1.25. The reactor was then cooled down to room temperature and the particle were washed 5 times, where the first wash was conducted at pH of 11 at room temperature, followed by 4 washes with deionized water at room temperature.

EXAMPLE 4

Toner Preparation Using PAC Aggregant Containing 5% Cyan Pigment, Surfactant Stabilized About 492 grams of the above prepared Latex A of Example 1 was added to 194.7 milliliters of water. The pH of this mixture was adjusted from 4.5 to 2.8 using 0.3M $HNO_3$. Then 26.3 gm of a Blue Pigment PB 15:3 dispersion having a solids content of 26.5 percent were simultaneously added to with high shear stirring by means of a polytron. To this mixture was added 19.5 gm of a coagulant solution consisting of 1.95 grams of polyaluminum chloride and 17.55 grams of a 0.02M solution of $HNO_3$. During addition of the coagulant solution the mixture was blended at a speed of 3,000 rpm and held for a period of 2 minutes after coagulant addition. The resulting mixture was transferred to a 2 liter reaction vessel and stirred at 400 rpm. This solution was then heated to a temperature of 48° C. After 90 minutes at a temperature of 48 deg C., this resulted in an aggregate size of about 4.48 microns and a GSD of 1.23. About 210.5 grams of Latex A was pH adjusted from 4.5 to 2.8 using 0.3M $HNO_3$. This was then added to the reactor as a shell portion. After an additional 30 minutes, this resulted in an aggregate size of about 5.47 and a GSD of 1.23. To this mixture was then added 31.5 gm of a 20% NEOGEN RK® solution to stabilize the aggregates from further growth. Subsequently, the resulting mixture was heated to 90° C. and retained there for a period of 1 hour at pH 2.8. The morphology of the toner particles was spherical. The particle size measured was 5.75 microns with a GSD of 1.25. The reactor was then cooled down to room temperature and the particle were washed 5 times, where the first wash was conducted at pH of 11 at room temperature, followed by 4 washes with deionized water at room temperature.

EXAMPLE 5

Toner Preparation Using Sanizol Aggregant Containing 5% Cyan Pigment, Base Stabilized About 492 grams of the above prepared Latex A of Example 1 was added to 194.7 milliliters of water. The pH of this mixture was adjusted from 4.5 to 2.8 using 0.3M $HNO_3$. Then 26.3 gm of a Blue Pigment PB 15:3 dispersion having a solids content of 26.5 percent were simultaneously added to with high shear stirring by means of a polytron. To this mixture was added 4.3 grams of a coagulant solution consisting of 2.15 grams of sanizol and 2.15 grams distilled water. During addition of the coagulant solution the mixture was blended at a speed of 3,000 rpm and held for a period of 2 minutes after coagulant addition. The resulting mixture was transferred to a 2 liter reaction vessel and stirred at 400 rpm. This solution was then heated to a temperature of 48° C. After 90 minutes at a temperature of 48 deg C., this resulted in an aggregate size of about 4.45 microns and a GSD of 1.22. About 210.5 grams of Latex A was pH adjusted from 4.5 to 2.8 using 0.3M $HNO_3$. This was then added to the reactor as a shell portion. After an additional 30 minutes, this resulted in an aggregate size of 5.47 and a GSD of 1.23. The pH of the resulting mixture was then adjusted from 2.8 to 7.0 with an aqueous base solution of 4 percent sodium hydroxide. Subsequently, the resulting mixture was heated to 90° C. and retained there for a period of 1 hour at pH 7. The morphology of the toner particles was spherical. The particle size measured was 5.70 microns with a GSD of 1.25. The reactor was then cooled down to room temperature and the particle were washed 5 times, where the first wash was conducted at pH of 11 at room temperature, followed by 4 washes with deionized water at room temperature.

EXAMPLE 6

Toner Preparation Using Sanizol Aggregant Containing 5% Cyan Pigment, Surfactant Stabilized About 492 grams of the above prepared Latex A of Example 1 was added to 194.7 milliliters of water. The pH of this mixture was adjusted from 4.5 to 2.8 using 0.3M $HNO_3$. Then 26.3 gm of a Blue Pigment PB 15:3 dispersion having a solids content of 26.5 percent were simultaneously added to with high shear stirring by means of a polytron. To this mixture was added 4.3 grams of a coagulant solution consisting of 2.15 grams of sanizol and 2.15 grams distilled water. During addition of the coagulant solution the mixture was blended at a speed of 3,000 rpm and held for a period of 2 minutes after coagulant addition. The resulting mixture was transferred to a 2 liter reaction vessel and stirred at 400 rpm. This solution was then heated to a temperature of 48° C. After 90 minutes at a temperature of 48 deg C., this resulted in an aggregate size of about 4.50 microns and a GSD of 1.22. About 210.5 grams of Latex A was pH adjusted from 4.5 to 2.8 using 0.3M $HNO_3$. This was then added to the reactor as a shell portion. After an additional 30 minutes, this resulted in an aggregate size of about 5.47 and a GSD of 1.23. To this mixture was then added a stabilizer solution consisting of 6.21 NEOGEN RK® and 31.05 grams of distilled water. Subsequently, the resulting mixture was heated to 90° C. and retained there for a period of 1 hour at pH 2.8. The morphology of the toner particles was spherical. The particle size measured was 5.73 microns with a GSD of 1.24. The reactor was then cooled down to room temperature and the particle were washed 5 times, where the first wash was conducted at pH of 11 at room temperature, followed by 4 washes with deionized water at room temperature.

We claim:
1. A process of preparing a chemical toner comprising:
(a) mixing together a latex and a first composition to result in a second composition, wherein the first composition includes a colorant dispersion and an optional wax dispersion, wherein the latex comprises polymeric particles dispersed in an aqueous phase, wherein the polymeric particles comprise a compound with a functional group covalently bound and with the functional group disposed on the particle surface, wherein the compound exhibits a molecular weight polydispersity of from about 1.1 to about 3.0;
(b) heating the second composition at an aggregation temperature which is at or below the glass transition temperature of the polymeric particles to form toner sized aggregates;
(c) adding a coagulant to the second composition prior to or during the heating of the second composition at the aggregation temperature to promote formation of the toner sized aggregates;
(d) stabilizing the particle size of the toner sized aggregates, resulting in a stabilized composition; and
(e) heating the stabilized composition at a coalescence temperature which is above the glass transition temperature of the polymeric particles to coalesce the toner sized aggregates into toner particles.

2. The process of claim 1, further comprising: isolating the toner particles.

3. The process of claim 1, wherein the stabilizing the particle size of the toner sized aggregates is accomplished by adding an ionic surfactant prior to the heating the stabilized composition at the coalescence temperature.

4. The process of claim 1, wherein the stabilizing the particle size of the toner sized aggregates is accomplished by changing the pH of the second composition prior to the heating the stabilized composition at the coalescence temperature.

5. The process of claim 1, wherein the heating the stabilized composition at the coalescence temperature is conducted for a time period ranging from about 1 to about 6 hours.

6. The process of claim 1, wherein the aggregation temperature ranges from about 1 to about 20 degrees C. below the glass transition temperature.

7. The process of claim 1, wherein the coalescence temperature ranges from about 3 to about 60 degrees C. above the glass transition temperature.

8. The process of claim 1, wherein the aggregation temperature is from about 29° C. to about 49° C., and wherein the coalescence temperature is from about 70° C. to about 130° C.

9. The process of claim 1, wherein the toner particles exhibit a geometric standard deviation of about 1.25 or less prior to any optional classification of the toner particles.

10. The process of claim 1, wherein the toner particles exhibit a geometric standard deviation ranging from about 1.18 to about 1.25 prior to any optional classification of the toner particles.

11. The process of claim 1, wherein the toner particles exhibit a geometric standard deviation ranging from about 1.23 to about 1.25 prior to any optional classification of the toner particles.

12. The process of claim 1, wherein the compound exhibits a molecular weight polydispersity of from about 1.1 to about 2.0.

13. The process of claim 1, wherein the compound exhibits a molecular weight polydispersity of from about 1.05 to about 1.45.

14. The process of claim 1, wherein the coagulant is a polymetal halide.

15. The process of claim 1, wherein the coagulant is selected from the group consisting of polyaluminum chloride, polyaluminum sulfo silicate, aluminum sulfate, zinc sulfate, magnesium sulfate, and mixtures thereof.

16. The process of claim 1, wherein the coagulant is a cationic surfactant selected from the group consisting of:

alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and mixtures thereof.

17. The process of claim 1, wherein the polymeric particles have a glass transition temperature ranging from about 45° C. to about 80° C.

18. The process of claim 1, wherein the compound is polymerized from a single monomer or a mixture of different monomers, wherein the single monomer and the mixture of different monomers are selected from the group consisting of:
    (a) an acrylic acid and its derivatives of the formula $(CH_2=CH)COOR$—COOH;
    (b) a maleic acid and its derivatives of the formula R',R"-maleicacid;
    (c) a styrenic monomer;
    (d) a methacrylic acid and its derivatives of the formula $(CH_2=CCH_3)COORCOOH$; and
    (e) a diene,
wherein R is an aliphatic group and wherein one of R' and R" is an aromatic group and the other is the aliphatic group, or R' and R" are the same or different aromatic group, or R' and R" are the same or different aliphatic group.

19. The process of claim 1, wherein the wax dispersion includes a wax which is a polyethylene or a polypropylene.

20. The process of claim 1, further comprising: adding a second portion of the latex to form a shell on the toner sized aggregates.

21. The process of claim 1, further comprising: adding a different latex to form a shell on the toner sized aggregates, wherein the different latex comprises a different compound with the same or different functional group as the compound.

22. The process of claim 1, wherein the compound is selected from the group consisting of: poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile).

23. The process of claim 1, wherein the compound is polymerized from a carboxylic acid selected from the group consisting of acrylic acid, methacrylic acid, itaconic acid, beta carboxy ethyl acrylate, fumaric acid, maleic acid, cinnamic acid, and mixtures thereof.

* * * * *